US012704353B2

(12) United States Patent
Sun et al.

(10) Patent No.: US 12,704,353 B2
(45) Date of Patent: Aug. 11, 2026

(54) SIGHT SYSTEM BASED ON INFRARED IMAGING, LOW-ILLUMINATION IMAGING AND LED AIMING LIGHT SPOT FUSION, AND SPLIT-TYPE FUSION SIGHT

(71) Applicant: HUANIC CORPORATION, Xi'an (CN)

(72) Inventors: Jianhua Sun, Xi'an (CN); Dong Wang, Xi'an (CN); Weike Sun, Xi'an (CN); Xuewen Cheng, Xi'an (CN)

(73) Assignee: HUANIC CORPORATION, Xi'an (CN)

(*) Notice: Subject to any disclaimer, the term of this patent is extended or adjusted under 35 U.S.C. 154(b) by 18 days.

(21) Appl. No.: 18/715,761

(22) PCT Filed: Nov. 30, 2022

(86) PCT No.: PCT/CN2022/135710
§ 371 (c)(1),
(2) Date: Dec. 2, 2024

(87) PCT Pub. No.: WO2023/098772
PCT Pub. Date: Jun. 8, 2023

(65) Prior Publication Data

US 2025/0334374 A1 Oct. 30, 2025

(30) Foreign Application Priority Data

Dec. 2, 2021 (CN) ......................... 202123004900.8
Nov. 24, 2022 (CN) ......................... 202223132354.0

(51) Int. Cl.
*F41G 1/36* (2006.01)
*F41G 1/30* (2006.01)
(Continued)

(52) U.S. Cl.
CPC ................ *F41G 1/36* (2013.01); *F41G 1/30* (2013.01); *F41G 1/38* (2013.01); *G02B 27/14* (2013.01)

(58) Field of Classification Search
CPC ... F41G 1/36; F41G 1/30; F41G 1/387; G02B 27/14
See application file for complete search history.

(56) References Cited

U.S. PATENT DOCUMENTS 7,333,270 B1 2/2008 Pochapsky et al.
9,069,172 B1 6/2015 Morley
(Continued)

FOREIGN PATENT DOCUMENTS

CN 201159619 Y 12/2008
CN 103279938 A 9/2013
(Continued)

OTHER PUBLICATIONS

English translation of first Office Action for Japanese Patent Application No. 2024-533113, mailed on Mar. 25, 2025.
(Continued)

*Primary Examiner* — J. Woodrow Eldred
(74) *Attorney, Agent, or Firm* — Fox Rothschild LLP

(57) ABSTRACT

The present invention relates to a split-type fusion sight, comprising a sight main body. An aiming assembly connecting base is arranged at the top of the main body; the aiming assembly connecting base comprises an engagement groove located on the front side, and an engagement base located on the rear side; an engagement block is arranged in the middle of the engagement groove, and a wire arranging base is arranged on the right side of the engagement base; the aiming assembly connecting base is further provided with connecting screw holes. The split-type fusion sight can fuse the low-light-level night vision or thermal imaging lens
(Continued)

imaging with human eye observation of a target to assist in observing or determining the target, and then determines the aiming target by means of an aiming light point, thereby performing accurate shooting. In addition, the low-light-level night vision or thermal imaging lens imaging module is arranged above the sight main body, and is fixedly connected by means of the aiming assembly connecting base and connecting screws. It is convenient to replace the low-light-level night vision module or thermal imaging module, the sight main body does not need to be disassembled, and disassembly and replacement are more convenient.

7 Claims, 11 Drawing Sheets

(51) Int. Cl.
*F41G 1/38* (2006.01)
*G02B 27/14* (2006.01)

(56) References Cited

U.S. PATENT DOCUMENTS

| | | | |
|---|---|---|---|
| 10,126,099 | B1 | 11/2018 | Hammond et al. |
| 10,837,737 | B1 * | 11/2020 | Wright ...................... F41G 1/08 |
| 2012/0030985 | A1 * | 2/2012 | Mauricio ............... G02B 23/10 42/84 |
| 2012/0106170 | A1 | 5/2012 | Matthews et al. |
| 2012/0262615 | A1 | 10/2012 | Gaber |
| 2017/0176139 | A1 | 6/2017 | Zhang et al. |
| 2020/0025522 | A1 | 1/2020 | Zimmer |

FOREIGN PATENT DOCUMENTS

| | | | |
|---|---|---|---|
| CN | 103868409 | A | 6/2014 |
| CN | 204043497 | U | 12/2014 |
| CN | 105300175 | A | 2/2016 |
| CN | 205262297 | U | 5/2016 |
| CN | 105300175 | B | 10/2017 |
| CN | 206556511 | U | 10/2017 |
| CN | 108562190 | A | 9/2018 |
| CN | 110139079 | A | 8/2019 |
| CN | 110832266 | A | 2/2020 |
| CN | 111435063 | A | 7/2020 |
| CN | 111947515 | A | 11/2020 |
| CN | 112082426 | A | 12/2020 |
| CN | 212567122 | U | 2/2021 |
| CN | 213300971 | U | 5/2021 |
| CN | 114251977 | A | 3/2022 |
| CN | 217483350 | U | 9/2022 |
| CN | 115235292 | A | 10/2022 |
| CN | 217953275 | U | 12/2022 |
| JP | 2020525849 | A | 8/2020 |

OTHER PUBLICATIONS

English translation of first Office Action for Japanese Patent Application No. 2024-533102, mailed on Mar. 25, 2025.
English translation of first Office Action for Chinese Patent Application No. 202210970881.4, mailed on Jun. 4, 2025.
Chinese language International Search Report mailed on Feb. 23, 2023 in PCT/CN2022/135711.
English International Search Report mailed on Feb. 23, 2023 in PCT/CN2022/135711.
Chinese Written Opinion mailed on Feb. 23, 2023 in PCT/CN2022/135711.
Chinese language International Search Report mailed on Feb. 13, 2023 in PCT/CN2022/135710.
English International Search Report mailed on Feb. 13, 2023 in PCT/CN2022/135710.
Chinese Written Opinion mailed on Feb. 13, 2023 in PCT/CN2022/135710.
Extended European Search Report mailed on Feb. 11, 2026 in European Patent Application No. 22900576.4.

* cited by examiner

SIGHT SYSTEM BASED ON INFRARED IMAGING, LOW-ILLUMINATION IMAGING AND LED AIMING LIGHT SPOT FUSION, AND SPLIT-TYPE FUSION SIGHT

CROSS REFERENCE

This application is a National Stage application of PCT/CN2022/135710, filed on Nov. 30, 2022, which claims the benefit of both Chinese Application No. 202123004900.8, filed on Dec. 2, 2021, and Chinese Application No. 202223132354.0, filed on Nov. 24, 2022, all of which are incorporated herein by reference in their entirety.

TECHNICAL FIELD

The present disclosure belongs to the technical field of gun sights, and in particular, relates to a sight system based on a fusion of infrared photography, low-illumination photography and an LED aiming light spot, and a split-type fusion sight.

BACKGROUND

The patent application No. 202210970881.4 discloses a sight with a thermal imaging function, the sight includes a body, where a battery cover assembly, a thermal imaging lens assembly, a thermal imaging core system assembly, a battery, an adjusting assembly and a beam splitting display assembly are provided below the body. The battery cover assembly and the thermal imaging lens assembly are arranged side by side, the battery is provided behind the battery cover assembly, the thermal imaging core system assembly is arranged behind the thermal imaging lens assembly, the adjusting assembly is arranged behind the thermal imaging core system assembly, and the beam splitting display assembly is arranged above the adjusting assembly. And, the battery cover assembly is replaced with an infrared lighting assembly and the thermal imaging lens assembly is replaced with a low-light night vision camera module. By fusing the thermal imaging lens photography or infrared illumination, low-light night vision photography and observation of the target with human eye, the sight with the thermal imaging function can assist in observing the target or identifying the same, and then determining the aiming target through an aiming light spot, so as to perform an accurate shooting, and that the impact of environmental factors such as light and distance on the accuracy of shooting can be reduced, and the risk of exposure of shooters can be reduced. The sight enables the identification of targets in such a manner that it is not solely dependent on human observation of target, improves the identifiability of the target and expands the application environment of red dot sights. However, the sight with the thermal imaging function or low-light night vision function cannot implement the switching of functions between thermal imaging and low-light night vision.

SUMMARY

The present disclosure is to solve the problem of inconvenience in assembly replacement of the existing sights with thermal imaging lens photography or infrared lighting sights and low-light night vision photography.

A split-type fusion sight described in the present disclosure includes a main body of the sight, where an aiming assembly connecting base is provided at the top of the main body. The aiming assembly connecting base includes an engagement groove provided at the front and an engagement base provided at the rear. An engagement block is provided in the middle of the engagement groove, and a flat cable base is provided in the right of the engagement base. The aiming assembly connecting base is further provided with a connecting screw hole.

Further, the aiming assembly connecting base is connected with an aiming assembly thereon, and the aiming assembly is a low-light night vision aiming assembly or a thermal imaging aiming assembly.

Further, the low-light night vision aiming assembly includes a low-light night vision main body, a low-light night vision lens and an infrared supplemental lighting system provided in front of the low-light night vision main body, a charging end provided on the left side of the low-light night vision main body, an infrared supplemental lighting start button provided on the right side of the low-light night vision main body, a function menu button provided in the rear of the low-light night vision main body, a switch button provided at the top of the low-light night vision main body, and pin headers of adapter board provided at the bottom of the low-light night vision main body. A low-light core system is further provided within the low-light night vision main body, the low-light core system is electrically connected with the pin headers of adapter board via a soft PCB flat cable.

Further, the thermal imaging aiming assembly includes a thermal imaging main body, a thermal imaging lens provided in front of the thermal imaging main body, a second charging end provided on the left side of the thermal imaging main body, a second function menu button provided in the rear of the thermal imaging main body, a second switch button provided at the top of the thermal imaging main body, and second pin headers of adapter board provided at the bottom of the thermal imaging main body. A thermal imaging core system is further provided within the thermal imaging main body, and the thermal imaging core system is electrically connected with the second pin headers of adapter board via a second soft PCB flat cable.

Further, a beam splitting display assembly and a red dot adjusting assembly are provided within the main body. A front lens cover assembly is provided in front of the main body, a rear lens cover assembly is provided in the rear of the main body, a battery compartment is provided at the left side of the main body, a battery is provided in the battery compartment, the battery compartment is further provided with a battery cover assembly, a first adjusting screw is further provided on the left side of the main body, and a red dot button and a second adjusting screw are provided on the right side of the main body.

Further, the beam splitting display assembly includes a beam splitter base, a beam splitter provided in the beam splitter base, a display screen provided on the right side of the beam splitter base, and a beam splitter cover provided above the beam splitter base.

Further, the red dot adjusting assembly includes an adjusting assembly main body, the adjusting assembly main body is provided with an LED base, the LED base is connected to a chip base, and the chip base is provided with an LED graphics chip. The lower left side of the adjusting assembly main body is provided with a slope, the slope is in contact with a beveled ejector block, and the first adjusting screw is provided on the left side of the beveled ejector block. A transverse ejector block is provided on the right side of the adjusting assembly main body, the second adjusting screw is provided on the right side of the transverse ejector block. A transverse ejector spring is further provided between the adjusting assembly main body and the transverse ejector block, and a compression spring is provided above the adjusting assembly main body.

Further, a sight system based on a fusion of infrared photography, low-illumination photography and an LED aiming light spot includes an LED graphics chip, a lens glass, a beam splitter, a display screen, a thermal imaging core system, a low-light core system and a main control board. The thermal imaging core system is electrically connected with the main control board, the low-light core system is electrically connected with the main control board, the thermal imaging core system and the low-light core system are both electrically connected to the display screen, the main control board is electrically connected with the LED graphics chip and the display screen, respectively. Light emitted by the LED graphics chip and light emitted by the display screen pass through the beam splitter and are incident to the lens glass.

Further, the light incident from the display screen to the beam splitter and the light incident from the LED graphics chip to the beam splitter are arranged at 90°.

Further, the sight system based on the fusion of infrared photography, low-illumination photography and the LED aiming light spot further includes an OLED screen, where the main control board is electrically connected to the OLED screen, and the light emitted by the OLED screen is incident to the lens glass.

The present disclosure provides the following beneficial effects: The split-type fusion sight provided by the present disclosure can fuse the low-light night vision or thermal imaging lens photography with observation of the target with human eye, and can assist in observing the target or identifying the same, and then determining the aiming target through an aiming light spot, so as to perform an accurate shooting. In addition, the low-light night vision or thermal imaging lens camera is arranged above the main body of the sight and is fixedly connected by the aiming assembly connecting base and connecting screws. It is very easy to replace a low-light night vision module or a thermal imaging module without the need to separate the main body of the sight, thereby making it more convenient in disassembly and replacement operation. The present disclosure further provides a sight system based on a fusion of infrared photography, low-illumination photography and an LED aiming light spot. Through the fusion of infrared photography, low-illumination photography and observation of the target with human eye, it can assist in observing the target or identifying the same, and then determining the aiming target through an aiming light spot, so as to perform an accurate shooting. The sight system based on the fusion of infrared photography, low-illumination photography and the LED aiming light spot can reduce the impact of environmental factors such as light and distance on the accuracy of shooting, enable the identification of targets in such a manner that it is not solely dependent on human observation of the target, improve the identifiability of the target and expand the application environment of red dot sights.

The present disclosure will be further described in detail below with reference to embodiments.

Figure 1:
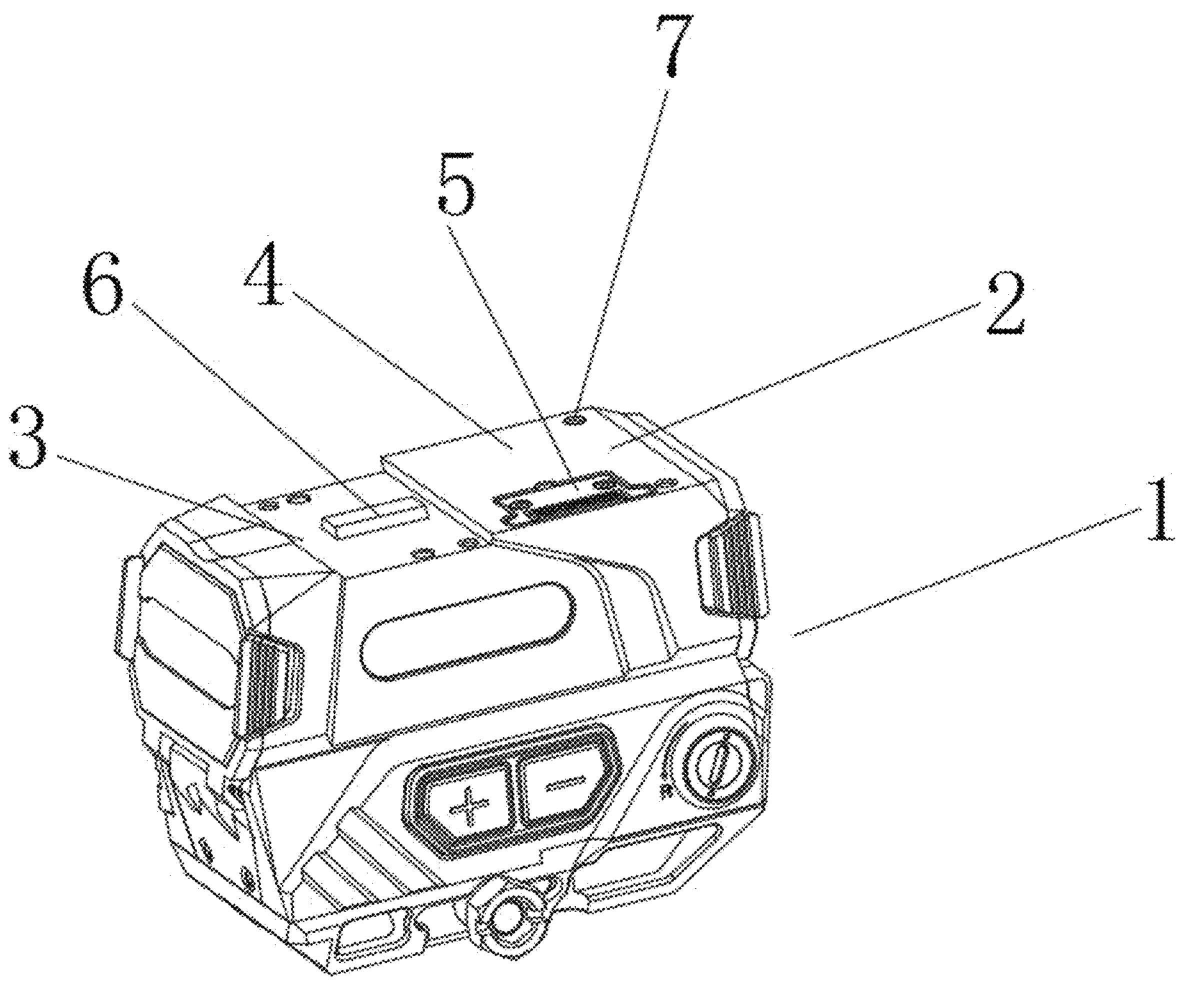
FIG. 1 is an overall schematic structural view of a main body of a sight.

In the drawings: 1. Main body of the sight; 2. Aiming assembly connecting base; 3. Engagement groove; 4. Engagement base; 5. Flat cable base; 6. Engagement block; 7. Connecting screw hole; 8. Low-light night vision aiming assembly; 9. Thermal imaging aiming assembly; 10. Low-light night vision main body; 11. Low-light night vision lens; 12. Infrared supplemental lighting system; 13. Charging end; 14. Infrared supplemental lighting start button; 15. Function menu button; 16. Switch button; 17. Pin headers of adapter board; 18. Low-light core system; 19. Soft PCB flat cable; 20. Thermal imaging main body; 21. Thermal imaging lens; 22. Second charging end; 23. Second function menu button; 24. Second switch button; 25. Second pin headers of adapter board; 26. Thermal imaging core system; 27. Second soft PCB flat cable; 28. Beam splitting display assembly; 29. Red dot adjusting assembly; 30. Front lens cover assembly; 31. Rear lens cover assembly; 32. Battery; 33. Battery cover assembly; 34. First adjusting screw; 35. Red dot button; 36. Second adjusting screw; 37. Adjusting assembly main body; 38. LED base; 39. Chip base; 40. LED graphics chip; 41. Slope; 42. Beveled ejector block; 43. Transverse ejector block; 44. Cover; 45. Transverse ejector spring; 46. Compression spring; 47. Beam splitter base; 48. Beam splitter; 49. Display screen; 50. Beam splitter cover; 51. Second cover; 52. Main control board; 53. Lens glass; 54. Target; 55. Eye.

DETAILED DESCRIPTION

In order to further elaborate the technical means adopted by the present disclosure to achieve the intended purpose and the effects thereof, the specific implementation, structural features and effects thereof of the present disclosure are to be described in detail below with reference to the drawings and the embodiments.

Hereinafter, the technical solutions of the embodiments of the present disclosure will be clearly and completely described with reference to the accompanying drawings of the embodiments of the present disclosure. Obviously, the described embodiments are only some of the embodiments of the present disclosure, but not all of them. Based on the embodiments of the present disclosure, all other embodiments obtained by those of ordinary skill in the art without paying creative efforts fall within the scope of protection of the present disclosure.

In the description of the present disclosure, it should be understood that the orientations or positional relationships indicated by the terms such as "center", "upper", "lower", "front", "rear", "left", "right", "vertical", "horizontal", "align", "overlap", "bottom", "inside", "outside", etc., are orientations or positional relationships shown based on the accompanying drawings, and are used only for the purpose of facilitating the description of the present disclosure and simplifying the description, and are not intended to indicate or imply that the apparatus or element referred to must have a specific orientation, or be constructed and operated in a particular orientation, thus they are not to be construed as a limitation of the present disclosure.

The terms "first" and "second" are used for descriptive purposes only and are not to be understood as indicating or implying any relative importance or implicitly specifying the number of the technical features indicated. Therefore, the features defined with "first" and "second" may explicitly or implicitly include one or more of the features; in the description of the present disclosure, unless otherwise stated, the meaning of "plurality" is two or more.

Embodiment 1

The present embodiment provides a split-type fusion sight as shown in FIG. 1 to FIG. 9, including a main body 1 of the sight, where an aiming assembly connecting base 2 is provided at the top of the main body, the aiming assembly connecting base 2 includes an engagement groove 3 at the front and an engagement base 4 at the rear, an engagement block 6 is provided in the middle of the engagement groove 3, a flat cable base 5 is provided on the right side of the engagement base 4, and the aiming assembly connecting base 2 is further provided with a connecting screw hole 7, One of the engagement groove 3 and the engagement base 4 presents a concave configuration and the other presents a convex configuration, which provide a better limiting and fixing effect for the aiming assembly placed above, and moreover, the limiting and fixing effect can be further enhanced by virtue of the engagement block 6 in the middle of the engagement groove 3.

Further, an aiming assembly is connected onto the aiming assembly connecting base, and the aiming assembly is a low-light night vision aiming assembly 8 or a thermal imaging aiming assembly 9. The low-light night vision aiming assembly 8 and the thermal imaging aiming assembly 9 can assist the shooter in aiming and shooting. The low-light night vision aiming assembly 8 or the thermal imaging aiming assembly 9 can take image. The captured image is synchronized with the image of a target observed by the shooter, and is fused with the real image of the target directly observed by the shooter under the action of the beam splitting display assembly 28 and the red dot adjusting assembly 29 provided in the main body 1, which can assist in observing the target or identifying the same, and then determining the aiming target through an aiming light spot, so as to perform an accurate shooting.

Further, the low-light night vision aiming assembly 8 includes a low-light night vision main body 10, a low-light night vision lens 11 and an infrared supplemental lighting system 12 both provided in front of the low-light night vision main body 10, a charging end 13 provided on the left side of the low-light night vision main body 10, an infrared supplemental lighting start button 14 provided on the right side of the low-light night vision main body 10, a function menu button 15 provided in the rear of the low-light night vision main body 10, a switch button 16 provided at the top of the low-light night vision main body 10, and pin headers 17 of adapter board provided at the bottom of the low-light night vision main body 10. A low-light core system 18 is further provided in the low-light night vision main body 10, and the low-light core system 18 is electrically connected with the pin headers of adapter board 17 via a soft PCB flat cable 19. A cover 44 is further provided underneath the low-light night vision main body 10 to seal both the low-light core system 18 and the pin headers of adapter board 17 within the low-light night vision main body 10. The pin headers of adapter board 17 matches the flat cable base 5 at the top of the main body 1 of the sight, thereby connecting the low-light night vision aiming assembly 8 to the display screen 49 inside the main body 1 of the sight, so that the display screen 49 can play the image taken by the low-light night vision aiming assembly 8.

Further, the thermal imaging aiming assembly 9 includes a thermal imaging main body 20, a thermal imaging lens 21 provided in front of the thermal imaging main body 20, a second charging end 22 provided on the left side of the thermal imaging main body 20, a second function menu button 23 provided in the rear of the thermal imaging main body 20, a second switch button 24 provided at the top of the thermal imaging main body 20, and second pin headers of adapter board 25 provided at the bottom of the thermal imaging main body 20. A thermal imaging core system 26 is further provided in the thermal imaging main body 20, and the thermal imaging core system 26 is electrically connected with the second pin headers of adapter board 25 via a second soft PCB flat cable 27. A second cover 51 is further provided underneath the thermal imaging main body 20 to seal both the thermal imaging core system 26 and the second pin headers of adapter board 25 within the thermal imaging main body 20. The second pin headers of adapter board 25 also matches the flat cable base 5 at the top of the main body 1 of the sight, thereby connecting the thermal imaging main body 20 to the display screen 49 inside the main body 1 of the sight, so that the display screen 49 can play the image taken by the thermal imaging aiming assembly 9.

Further, a beam splitting display assembly 28 and a red dot adjusting assembly 29 are provided in the main body 1. A front lens cover assembly 30 is provided in front of the main body 1, and a rear lens cover assembly 31 is provided in the rear of the main body 1. The front lens cover assembly 30 and the rear lens cover assembly 31 can rotate through pins provided at the bottom, and the pins are fixedly connected to the main body 1 through a connecting base. A battery compartment is provided at the left side of the main body 1, and batteries 32 are provided in the battery compartment, where two batteries are provided to make full use of the space, which can provide a longer endurance. The battery compartment is further provided with a battery cover assembly 33 which is also movably connected to the main body 1 through a pin, and the battery cover assembly 33 secures the two batteries 32 in the battery compartment. A first adjusting screw 34 is further provided on the left side of the main body 1, and a red dot button 35 and a second adjusting screw 36 are both provided on the right side of the main body 1. The first adjusting screw 34 and the second adjusting screw 36 are both used for adjusting the position of an adjusting assembly main body 37.

Further, the beam splitting display assembly 28 includes a beam splitter base 47, a beam splitter 48 provided in the beam splitter base 47, a display screen 49 provided on the right side of the beam splitter base 47, and a beam splitter cover 50 provided above the beam splitter base 47. The light incident from the display screen 49 to the beam splitter 48 and the light incident from the LED graphics chip 40 to the beam splitter 48 are arranged at 90°. It should be noted that one of the aiming light spot emitted by the LED graphics chip 40 and the image played on the display screen 49 is reflected by the beam splitter 48, while the other is transmitted by the beam splitter 48.

Further, the red dot adjusting assembly 29 includes the adjusting assembly main body 37, an LED base 38 is provided in the adjusting assembly main body 37, the LED base 38 is connected to a chip base 39, and the LED graphics chip 40 is provided on the chip base 39. The lower left side of the adjusting assembly main body 37 is provided with a slope 41, the slope 41 is in contact with a beveled ejector block 42, and the first adjusting screw 34 is provided on the left side of the beveled ejector block 42. A transverse ejector block 43 is provided on the right side of the adjusting assembly main body 37, the second adjusting screw 36 is provided on the right side of the transverse ejector block 43, and a transverse ejector spring 45 is further provided between the adjusting assembly main body 37 and the transverse ejector block 43. A compression spring 46 is provided above the adjusting assembly main body 37. An up and down adjustment may be applied to the red dot adjusting assembly 29 by rotating the first adjusting screw 34, and a left and right adjustment may be applied to the red dot adjusting assembly 29 by rotating the second adjusting screw 34.

In summary, the split-type fusion sight can fuse low-light night vision or thermal imaging lens photography with the target observed by human eye, and can assist in observing the target or identifying the same, and then determining the aiming target through an aiming light spot, so that an accurate shooting can be performed. In addition, the low-light night vision or thermal imaging lens camera is arranged above the main body of the sight, and is fixedly connected through the aiming assembly connecting base and connecting screws, and that it is very easy to replace a low-light night vision module or a thermal imaging module, without the need to separate the main body of the sight, thereby making it more convenient in disassembly and replacement operation.

Embodiment 2

The split-type fusion sight provided in Embodiment 2 is designed based on the design principle of the sight system based on the fusion of infrared photography, low-illumination photography and an LED aiming light spot shown in FIGS. 10 to 13. The difference is that according to the design two solutions are needed, one is that the thermal imaging core system is designed separately, and the other is a combination of the infrared supplemental lighting system and the low-light core system.

Figure 13:
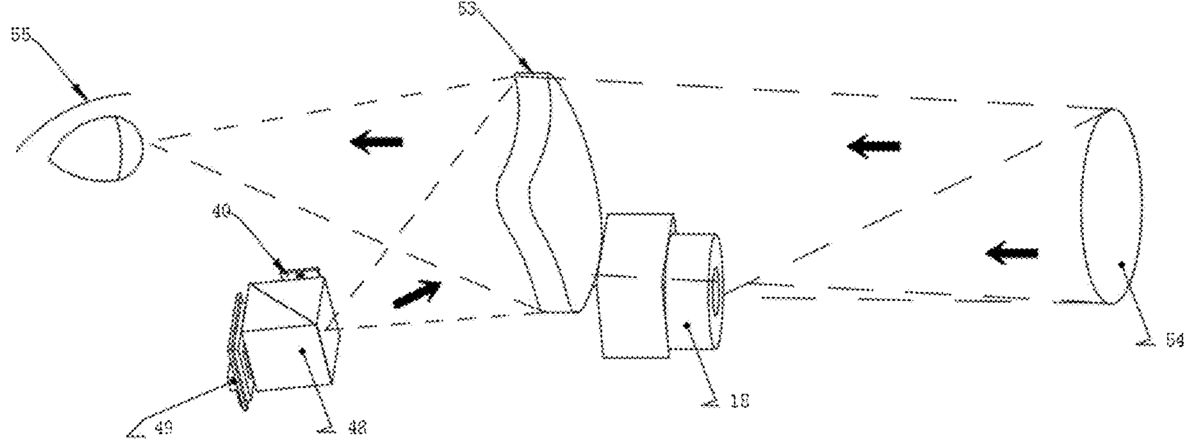
FIG. 13 is a schematic view showing the light path of the sight system based on the fusion of infrared photography, low-illumination photography and the LED aiming light spot.

The sight system, which is based on the fusion of infrared photography, low-illumination photography and the LED aiming light spot, includes an LED graphics chip 40, a lens glass 53, a beam splitter 48, a display screen 49, a thermal imaging core system 26, a low-light core system 18 and a main control board 52, The thermal imaging core system 26 is electrically connected with the main control board 52, the low-light core system 18 is electrically connected with the main control board 52, the thermal imaging core system 26 and the low-light core system 18 are both electrically connected to the display screen 49, and the main control board 52 is electrically connected to the LED graphics chip 40 and the display screen 49, respectively. Light emitted by the LED graphics chip 40 and light emitted by the display screen 49 pass through the beam splitter 48 and are incident to the lens glass 53. The LED graphics chip 40 provides an aiming light spot upon the control of the main control board 52. The light emitted by the LED graphics chip 40 is reflected or transmitted by the beam splitter 48, and then incident to the lens glass 53, the light is then reflected by the lens glass 53 and incident to the shooter's eyes 55. At the same time, the shooter's eyes 55 may directly observe the target 54 and the surrounding scenes through the lens glass 53. In addition, the thermal imaging core system 26 and the low-light core system 18 may capture video images of the target 54 and the surrounding scenes under the control of the control panel 1. The captured video images are played synchronously through the display screen 49. The images are incident to the lens glass 53 after being transmitted or refracted by the beam splitter 48, and are incident to the shooter's eyes 55 after being reflected by the lens glass 53. The source of the shooter's observation of the target 54 and the surrounding scenes may be the directly observed target 54 and the surrounding scenes, or it can be the video of the thermal imaging core system 26 and the low-light core system 18 projected by the display screen 49, thereby overcoming the problems of the existing sights that the observation is not clear and is greatly affected by environmental factors when the shooter directly observes the target 54 and the surrounding scenes through the lens glass 53. FIG. 13 is a schematic view showing the light path of the sight system based on the fusion of infrared photography, low-illumination photography and the LED aiming light spot. As can be seen from FIG. 13, the sight system is a reflective sight optical system, i.e., the light emitted by the LED graphics chip 40 and the display 49 are all reflected by the lens glass 53 and then enter the shooter's eyes 55.

Figure 2:
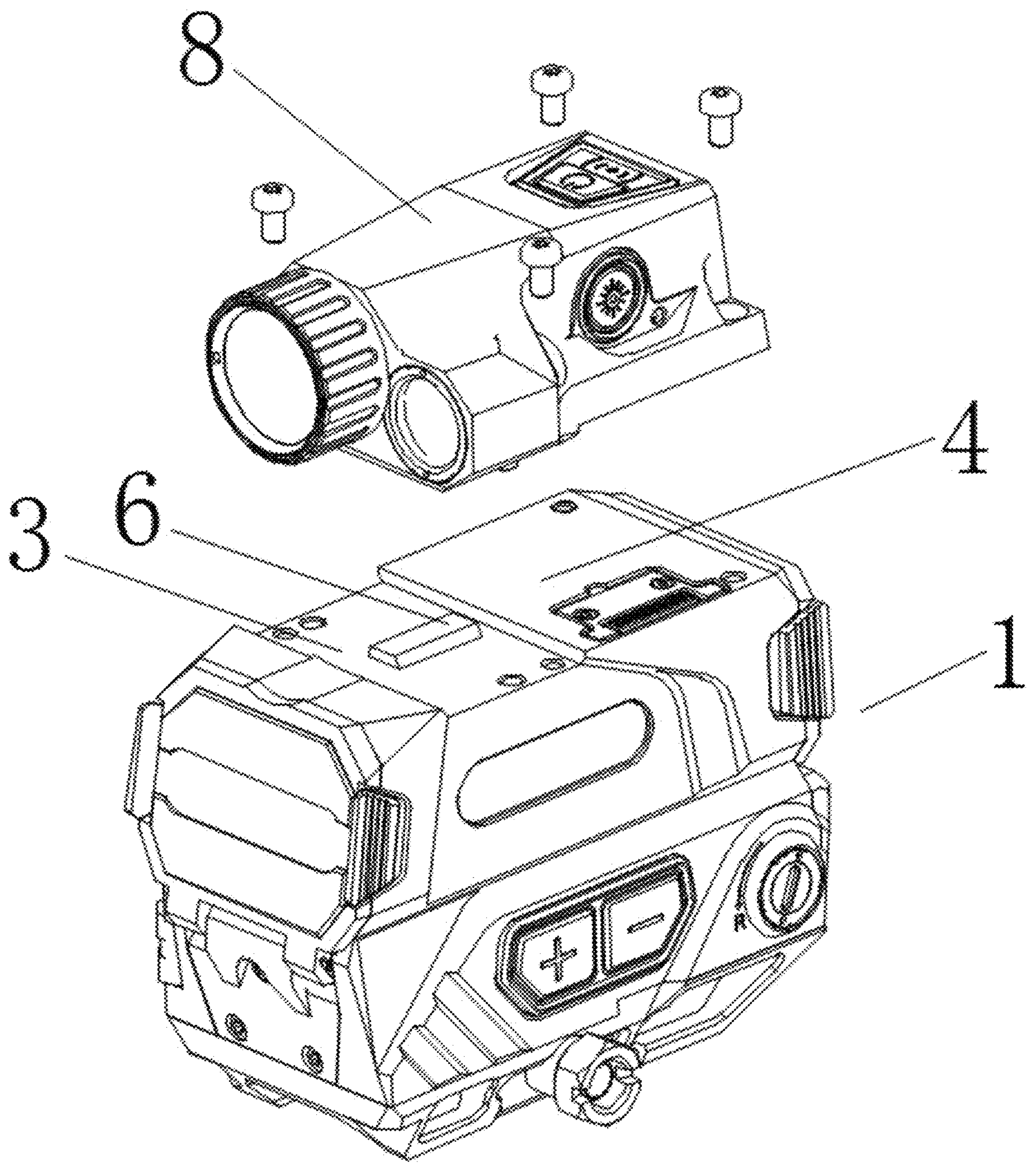
FIG. 2 is a schematic view of the main body of the sight and a low-light night vision aiming assembly.
Figure 3:
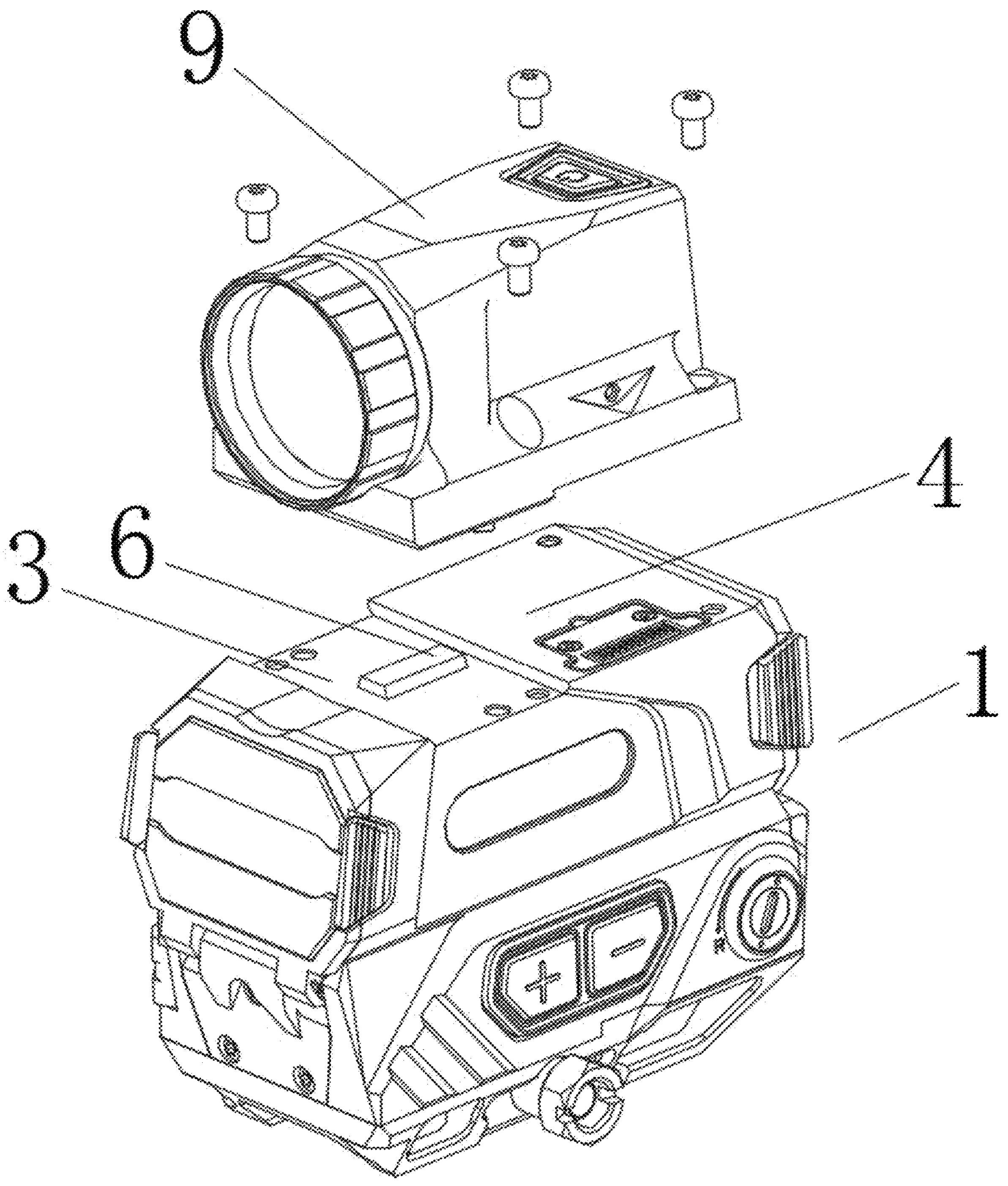
FIG. 3 is a schematic view of the main body of the sight and a thermal imaging aiming assembly.
Figure 4:
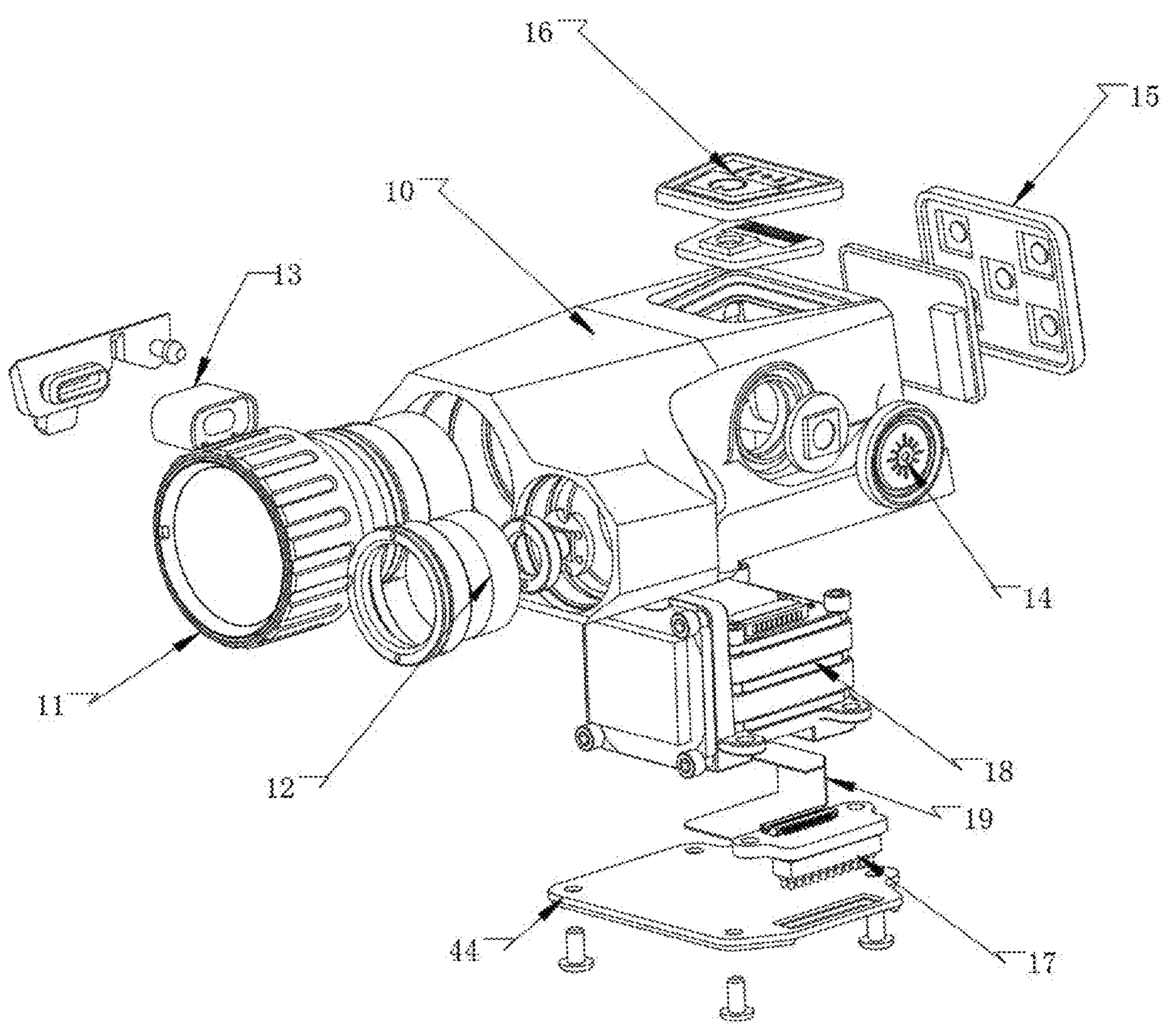
FIG. 4 is a schematic view of the low-light night vision aiming assembly in a disassembled state.
Figure 5:
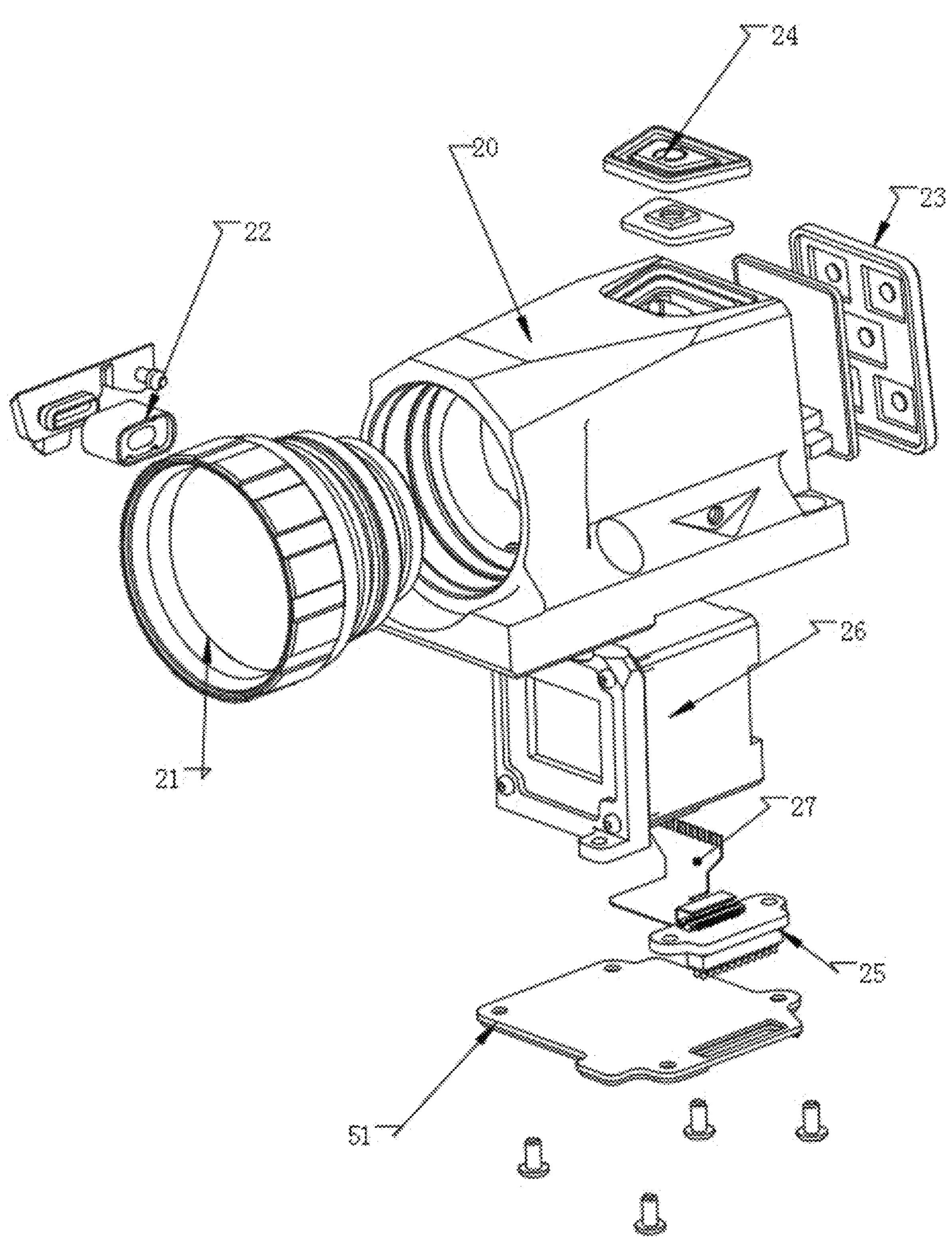
FIG. 5 is a schematic view of the thermal imaging aiming assembly in a disassembled state.

Further, the light incident from the display screen to the beam splitter and the light incident from the LED graphics chip to the beam splitter are arranged at 90°. It should be noted that one of the aiming light spot emitted by the LED graphics chip 40 and the image played by the display screen 49 is reflected by the beam splitter 48, and the other is transmitted by the beam splitter 48, as shown in FIGS. 2 and 3.

Further, the main function of the beam splitter 48 is to fuse light. Therefore, the beam splitter 48 may also be replaced by a semi-transparent and semi-reflective plane reflector.

Further, the sight system, which is based on the fusion of infrared photography, low-illumination photography and the LED aiming light spot, further includes a battery 32. The battery 32 is electrically connected with the LED graphics chip 40, the display screen 49, the thermal imaging core system 26, the low-light core system 18, and the main control board 52, respectively, and the battery is used to provide electrical energy required for the operation of the LED graphics chip 40, the display screen 49, the thermal imaging core system 26, the low-light core system 18, and the main control board 52.

Further, the battery 32 may be of a CR123A, 18650, 18350, polymer lithium battery, etc. The LED graphics chip 40 may use an LED chip set model HK-882. The display screen 49 may use a Micro LED or an OLED. The thermal imaging core system 26 may use Arrow's thermal imaging core system. The low-light core system 18 may use a SONY low-illumination 385 or 482 low-light core system. The main control board 52 is customized and developed according to the product requirements of using the LED graphics chip 40, the display screen 49, the thermal imaging core system 26, and the micro-light core system 18. For example, a main control board model 21109 developed based on the LED chipset model HK-882, Micro LED, the thermal imaging core system from Arrow, Amap, etc., and the SONY low-light CMOS sensor may be used.

Further, depending on different application scenarios, the thermal imaging core system 26, the low-light core system 18 shown may be provided separately from the sight. For example, the images captured by the thermal imaging core system 26 and the low-light core system 18 may be directly transmitted to the sight or AR glasses in a wireless or wired manner, thereby improving the identifiability of the target and expanding the application environment of red dot sights. A user can freely choose to use thermal imaging core system 26 or low-light core system 18 with the sight according to their own application scenarios.

Figure 6:
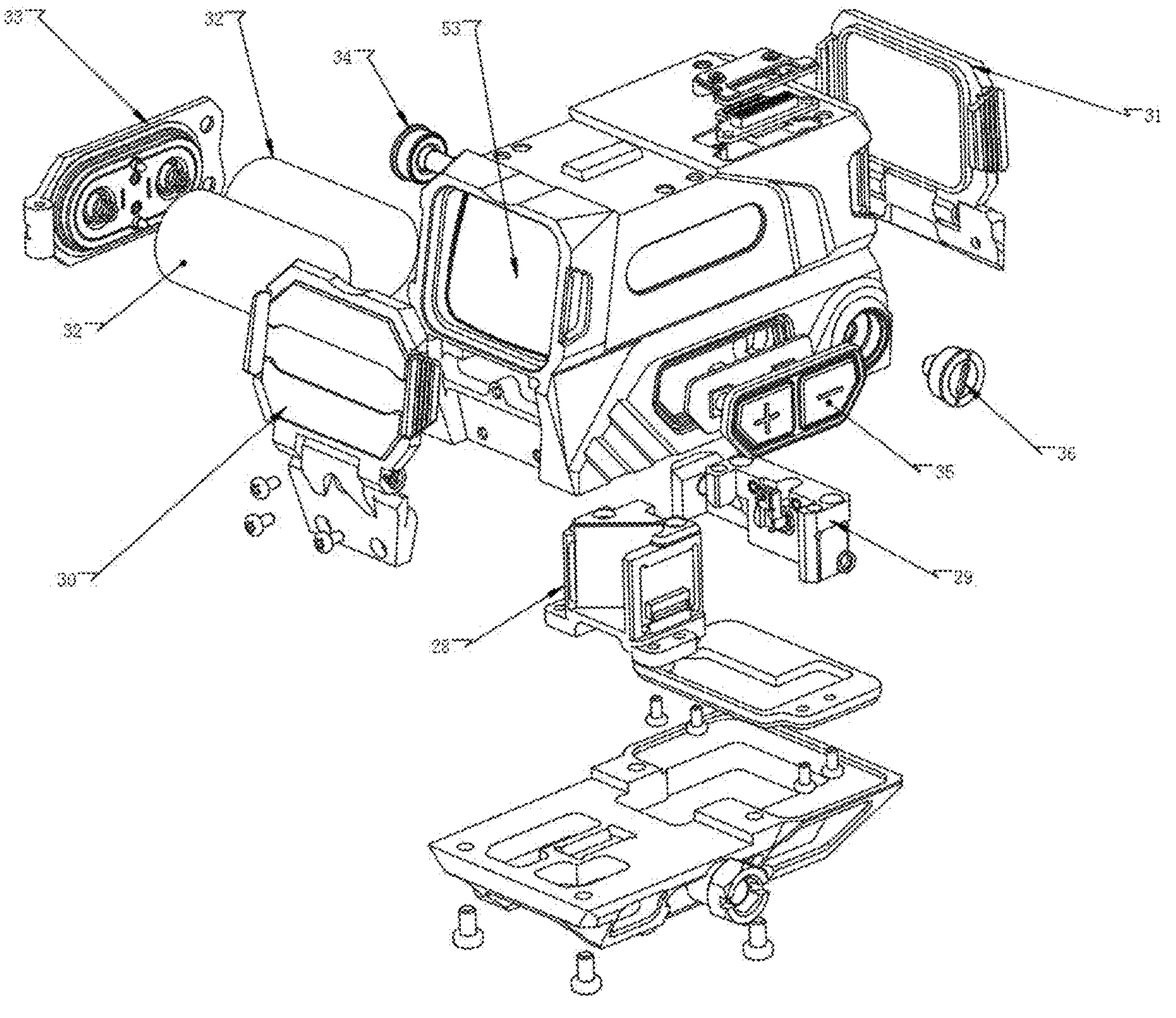
FIG. 6 is a schematic view of the main body of the sight in a disassembled state.
Figure 7:
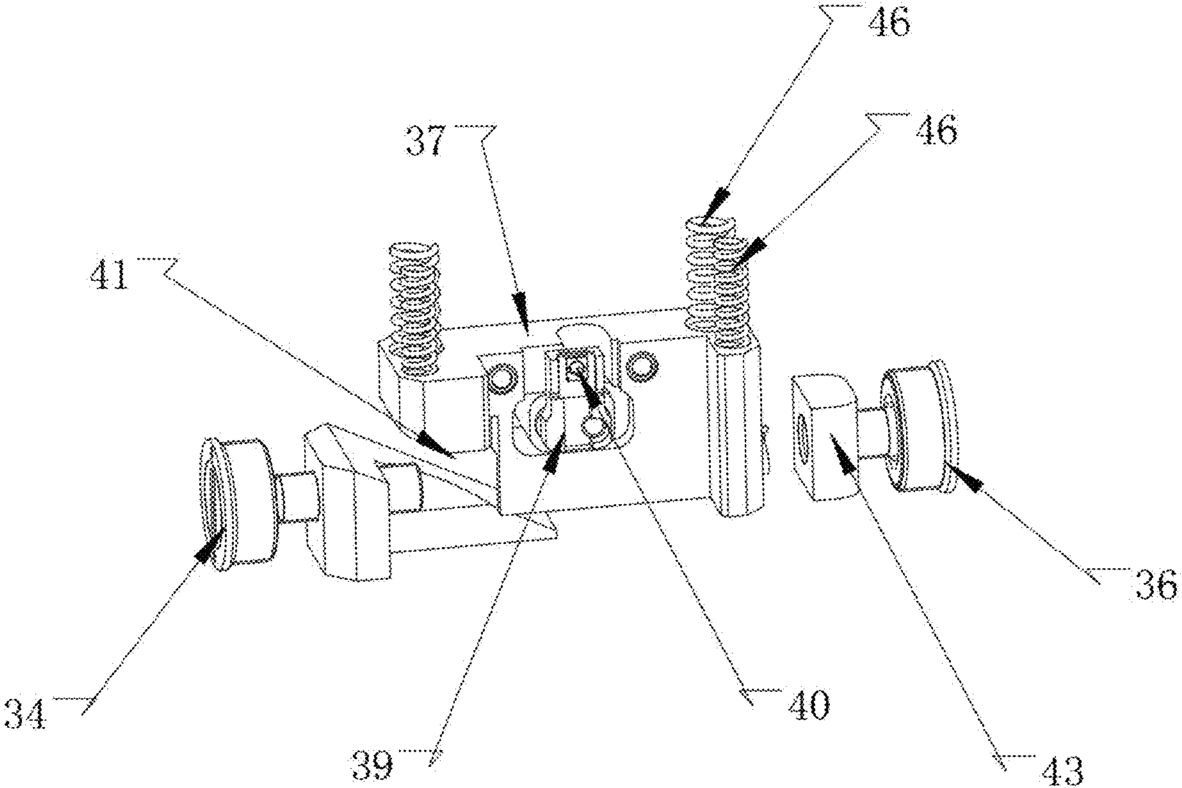
FIG. 7 is a first schematic structural view of a red dot adjusting assembly.
Figure 8:
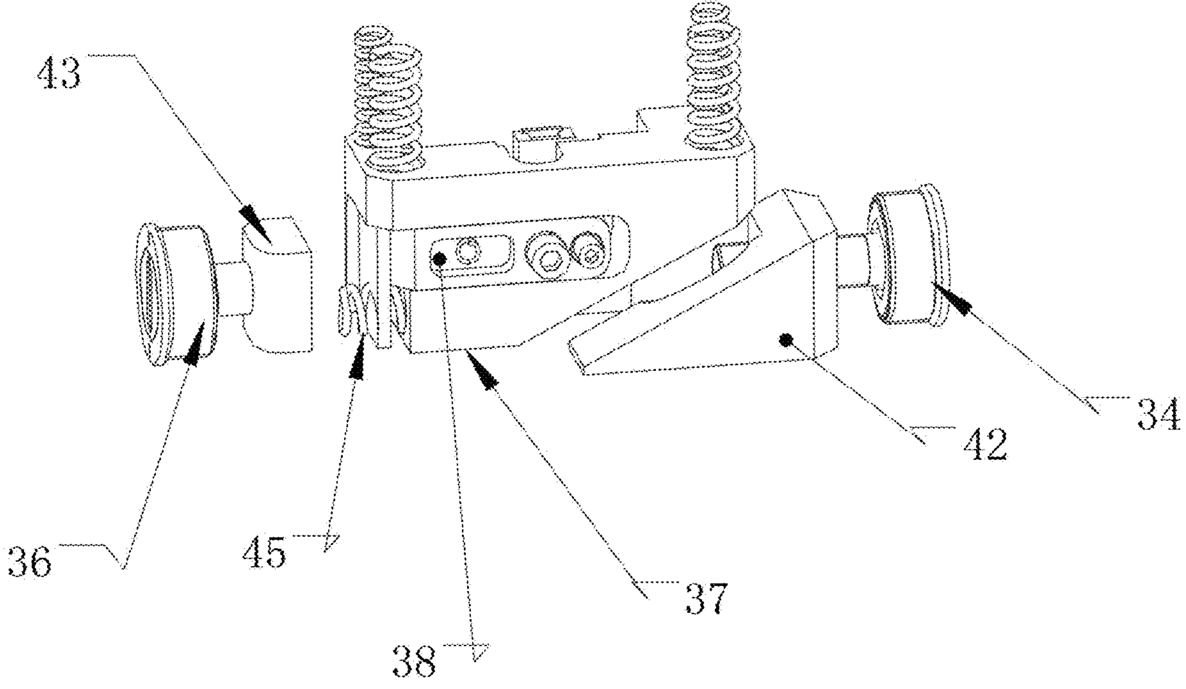
FIG. 8 is a second schematic structural view of the red dot adjusting assembly.
Figure 9:
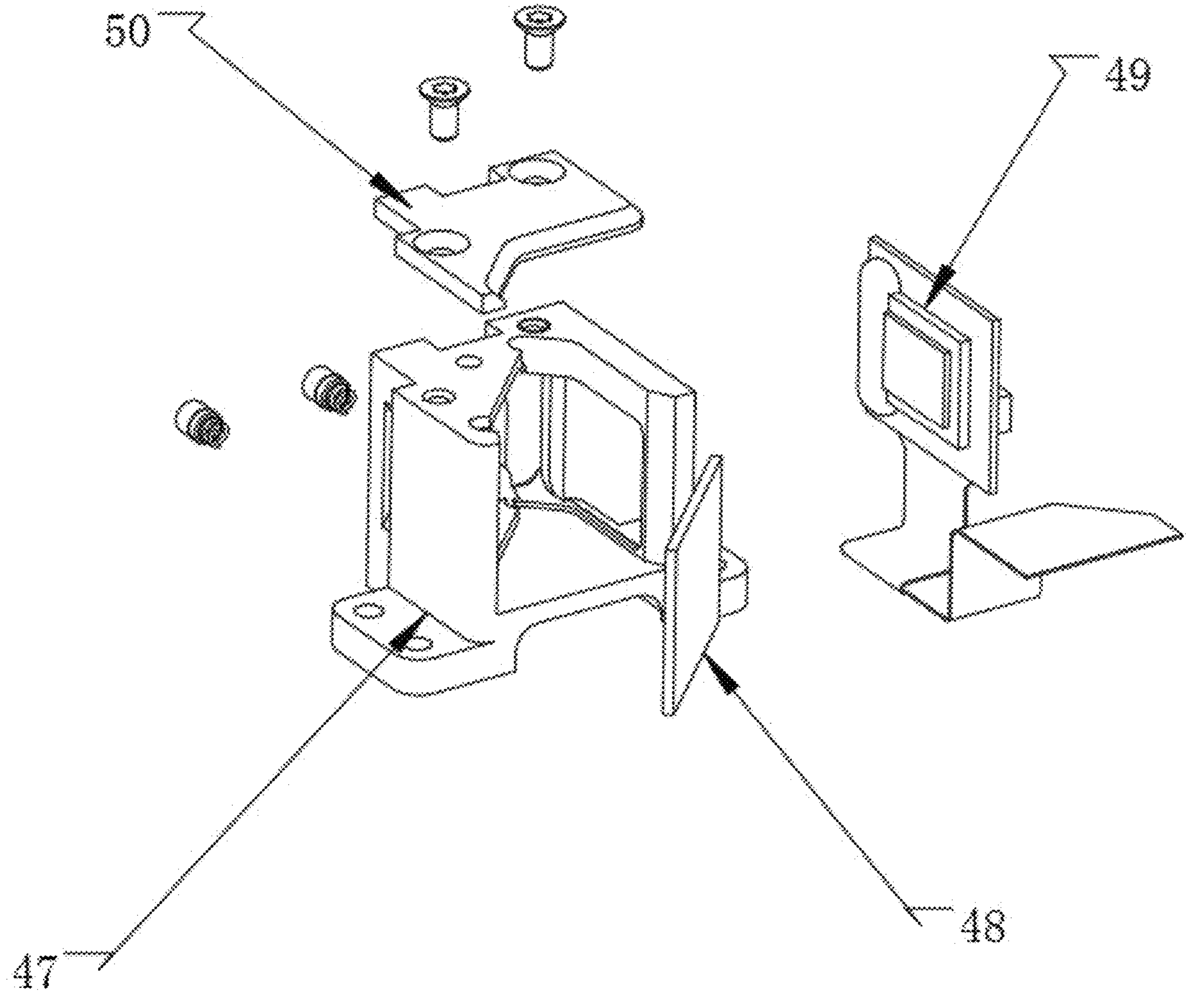
FIG. 9 is a schematic structural view of a beam splitting display assembly.
Figure 10:
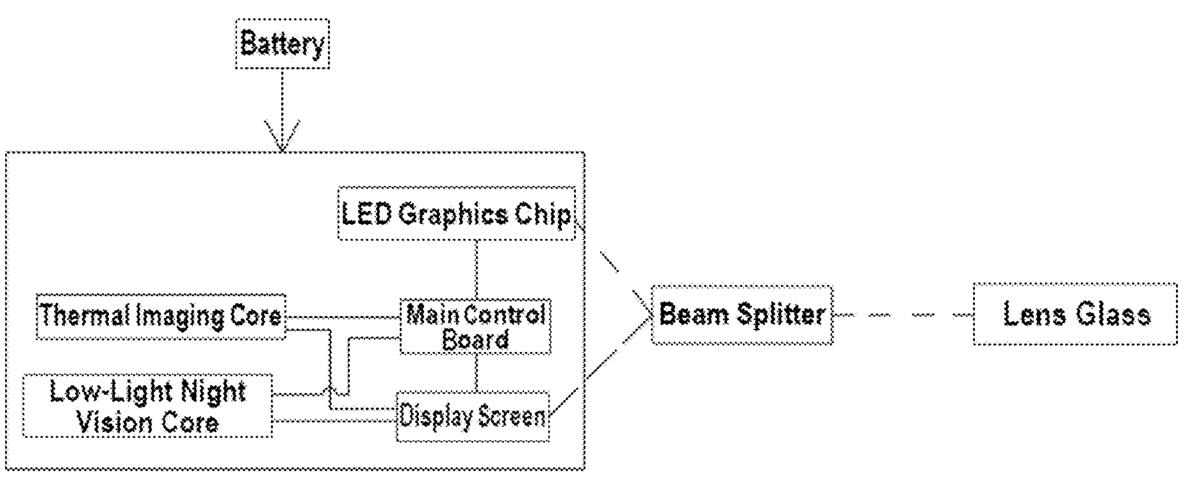
FIG. 10 is a schematic diagram showing the principle of a sight system based on a fusion of infrared photography, low-illumination photography and an LED aiming light spot.
Figure 11:
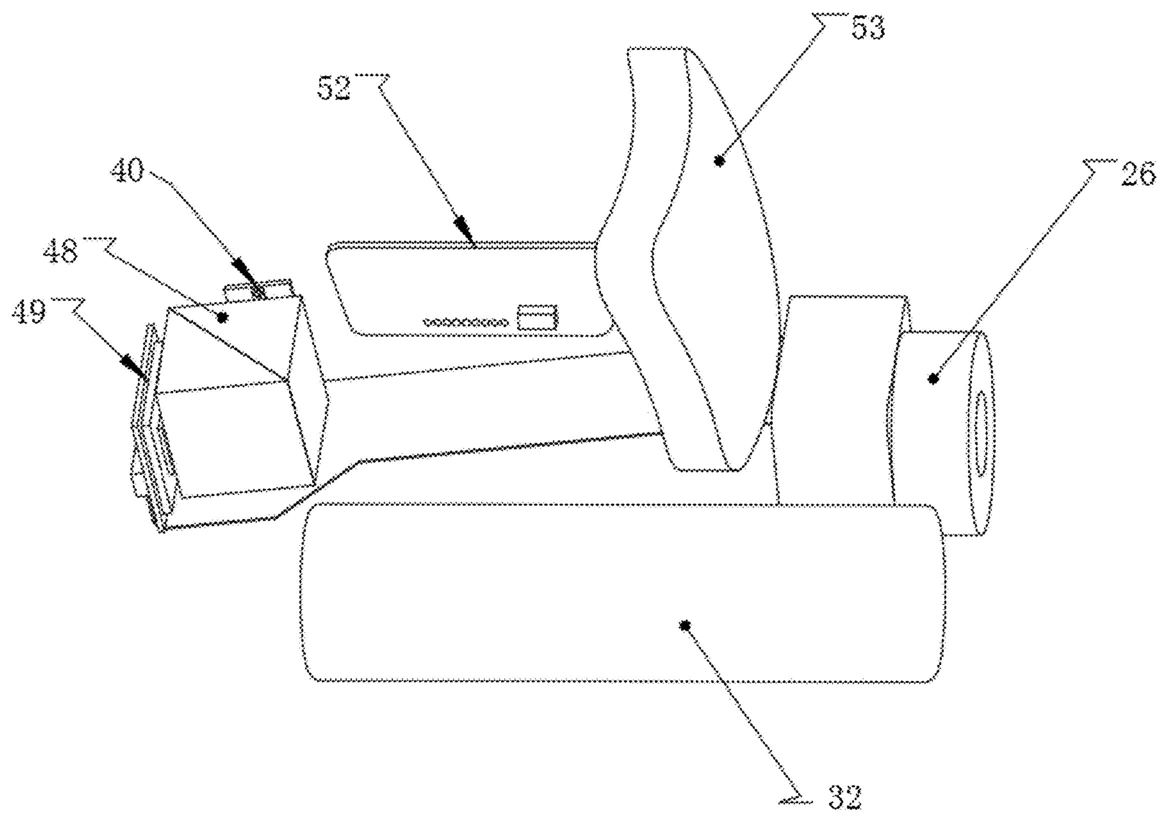
FIG. 11 is a first schematic view showing the application of the sight system based on the fusion of infrared photography, low-illumination photography and the LED aiming light spot.
Figure 12:
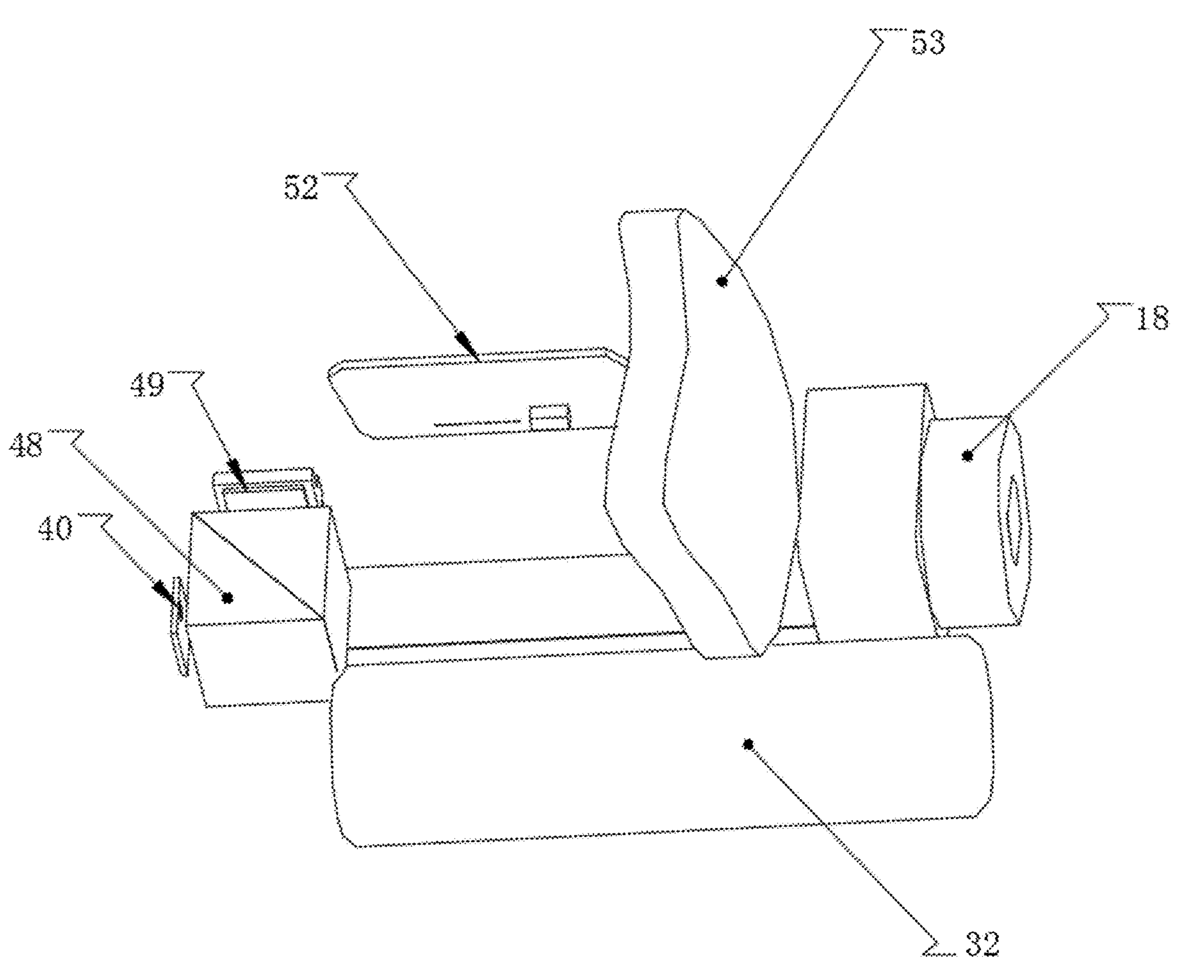
FIG. 12 is a second schematic view showing the application of the sight system based on the fusion of infrared photography, low-illumination photography and the LED aiming light spot.

It should be noted that in the split-type fusion sight of Embodiment 1, the main control board 52 is divided into two parts, where one part is located within the low-light night vision main body 10 and in front of the function menu button 15, which regulates and controls the low-light core system 18 and the infrared supplemental lighting system 12, or the part is located within the thermal imaging main body 20 and in front of the second function menu button 23, which regulates and controls the thermal imaging core system 26; while the other part is located within the main body 1 of the sight, and the brightness of the red dot is adjusted through the red dot button 35. In addition, as shown in FIG. 6, the lens glass 53 is also provided on the main body 1 of the sight.

Embodiment 3

On the basis of Embodiment 1, the LED graphics chip may also be replaced by a Micro LED screen. In this case, the system has two screens, one screen displays the divided image and the other screen displays the image captured by the infrared photography or low-illumination photography. Two paths of light are reflected or transmitted by the beam splitter and then incident to the lens glass, and further incident to the shooter's eyes after being reflected by the lens glass. At the same time, the shooter can also directly observe the image of target and surrounding through the lens glass.

Embodiment 4

Further, unlike Embodiment 2 and Embodiment 3, the sight system based on the fusion of infrared photography, low-illumination photography and the LED aiming light spot includes a lens glass, a OLED screen or Micro LED display screen, a thermal imaging core system, a low-light core system, and a main control board. The thermal imaging core system is electrically connected with the main control board, the low-light core system is electrically connected with the main control board, the thermal imaging core system and the low-light core system are both electrically connected to the display screen, the main control board is electrically connected to the OLED screen, and the light emitted by the OLED screen is incident to the lens glass. At this time, an OLED screen or Micro LED display is used, the beam splitter is not used, while two colors of LEDs of the OLED screen or Micro LED display screen are used, in which the green ones display the fused image and the red ones displays the divided image. The light emitted by the OLED screen or Micro LED display is directly incident to the lens glass, and is further incident to the shooter's eyes after being reflected by the lens glass. At the same time, the shooter can also directly observe the image of target and surrounding through the lens glass.

In summary, through the fusion of infrared photography, low-illumination photography and observation of the target with human eye, the sight system based on the fusion of infrared photography, low-illumination photography and the LED aiming light spot can assist in observing the target or identifying the same, and then determining the aiming target through an aiming light spot, so as to perform an accurate shooting. The sight system based on the fusion of infrared photography, low-illumination photography and the LED aiming light spot can reduce the impact of environmental factors such as light and distance on the accuracy of shooting, enable the identification of targets in such a manner that it is not solely dependent on human observation of target, improve the identifiability of the target and expand the application environment of red dot sights.

The above content is a further detailed description of the present disclosure in combination with specific preferred embodiments, and it cannot be concluded that the specific implementation of the present disclosure is limited to these descriptions. For those of ordinary skill in the technical field to which the present disclosure belongs, several simple deductions or substitutions can be made without departing from the concept of the present disclosure, which should be regarded as falling within the protection scope of the present disclosure.

What is claimed is:

1. A split-type fusion sight, comprising:

a main body of the sight, and;

an aiming assembly connecting base provided at a top of the main body, wherein the aiming assembly connecting base is connected with an aiming assembly thereon, wherein the aiming assembly connecting base comprises an engagement groove and an engagement base that are adjacent to each other, the engagement groove being provided at a front of the top of the main body and the engagement base being provided at a rear of the top of the main body;

wherein the engagement groove has a flat bottom surface that is lower than an upper surface of the engagement base, and protruding engagement block is provided in a middle of the bottom surface of the engagement groove, the bottom surface of the engagement groove and the upper surface of the engagement base both contact the aiming assembly, and a flat cable base is provided in the engagement base adjacent a left side thereof; and wherein the aiming assembly connecting base is further provided with a connecting screw hole.

2. The split-type fusion sight according to claim 1, wherein the aiming assembly is a low-light night vision aiming assembly or a thermal imaging aiming assembly.

3. The split-type fusion sight according to claim 1, wherein the low-light night vision aiming assembly comprises a low-light night vision main body, a low-light night vision lens and an infrared supplemental lighting system provided in front of the low-light night vision main body, a charging end provided on the left side of the low-light night vision main body, an infrared supplemental lighting start button provided on the right side of the low-light night vision main body, a function menu button provided in the rear of the low-light night vision main body, a switch button provided at the top of the low-light night vision main body, and pin headers of adapter board provided at the bottom of the low-light night vision main body; wherein a low-light core system is further provided within the low-light night vision main body; and the low-light core system is electrically connected with the pin headers of adapter board via a soft PCB flat cable.

4. The split-type fusion sight according to claim 1, wherein the thermal imaging aiming assembly comprises a thermal imaging main body, a thermal imaging lens provided in front of the thermal imaging main body, a second charging end provided on the left side of the thermal imaging main body, a second function menu button provided in the rear of the thermal imaging main body, a second switch button provided at the top of the thermal imaging main body, and second pin headers of adapter board provided at the bottom of the thermal imaging main body; wherein a thermal imaging core system is further provided within the thermal imaging main body; and the thermal imaging core system is electrically connected with the second pin headers of adapter board via a second soft PCB flat cable.

5. The split-type fusion sight according to claim 1, wherein a beam splitting display assembly and a red dot adjusting assembly are provided within the main body; a front lens cover assembly is provided in front of the main body, a rear lens cover assembly is provided in the rear of the main body, a battery compartment is provided at the left side of the main body, a battery is provided in the battery compartment, and the battery compartment is further provided with a battery cover assembly, wherein a first adjusting screw is further provided on the left side of the main body; and a red dot button and a second adjusting screw are provided on the right side of the main body.

6. The split-type fusion sight according to claim 1, wherein the beam splitting display assembly comprises a beam splitting display assembly comprising a beam splitter base, a beam splitter provided in the beam splitter base, a display screen provided on the right side of the beam splitter base, and a beam splitter cover provided above the beam splitter base.

7. The split-type fusion sight according to claim 5, wherein the red dot adjusting assembly comprises an adjusting assembly main body, the adjusting assembly main body is provided with an LED base, the LED base is connected to a chip base, and the chip base is provided with an LED graphics chip; the lower left side of the adjusting assembly main body is provided with a slope, the slope is in contact with a beveled ejector block, and the first adjusting screw is provided on the left side of the beveled ejector block; wherein a transverse ejector block is provided on the right side of the adjusting assembly main body, the second adjusting screw is provided on the right side of the transverse ejector block, and a transverse ejector spring is further provided between the adjusting assembly main body and the transverse ejector block; and wherein a compression spring is provided above the adjusting assembly main body.

* * * * *